(12) United States Patent
Anguera Pros et al.

(10) Patent No.: US 12,463,679 B2
(45) Date of Patent: *Nov. 4, 2025

(54) WIRELESS DEVICE

(71) Applicant: IGNION, S.L., Barcelona (ES)

(72) Inventors: Jaume Anguera Pros, Vinaros (ES);
Aurora Andujar Linares, Barcelona (ES)

(73) Assignee: Ignion, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,663

(22) Filed: May 28, 2024

(65) Prior Publication Data

US 2024/0396584 A1    Nov. 28, 2024

Related U.S. Application Data

(63) Continuation of application No. 18/450,046, filed on Aug. 15, 2023, now abandoned, which is a
(Continued)

(51) Int. Cl.
*H04B 1/40* (2015.01)
*H04B 1/3888* (2015.01)

(52) U.S. Cl.
CPC ............. *H04B 1/40* (2013.01); *H04B 1/3888* (2013.01)

(58) Field of Classification Search
CPC ...... H04B 1/0458; H04B 1/40; H04B 1/3888; H04B 1/18; H04B 7/185; H04B 7/2041;
(Continued)

(56) References Cited

U.S. PATENT DOCUMENTS 6,232,841 B1 * 5/2001 Bartlett ................ H03F 3/2176
330/306
7,663,556 B2   2/2010 Desclos et al.
(Continued)

FOREIGN PATENT DOCUMENTS

CN    103155276 B    11/2015
CN    104508905 B    10/2016
(Continued)

OTHER PUBLICATIONS

Ahn, Minsik, Design and analysis of high power and low harmonic RF front end for multi-band wireless application, dissertation, Dec. 2007, 146p., Georgia Institute of Technology.
(Continued)

*Primary Examiner* — Ajibola A Akinyemi
(74) *Attorney, Agent, or Firm* — Edell, Shapiro & Finnan, LLC

(57) ABSTRACT

A wireless device includes a ground plane layer having a maximum size smaller than half of a longest free-space operating wavelength of the wireless device, a boosting element having a largest dimension smaller than $\frac{1}{6}$ times the longest free-space operating wavelength, and a radiofrequency system with a tunable reactive circuit. The tunable reactive circuit includes a switch connected between the boosting element and a transceiver and a bank of fixed matching networks. At least a portion of an orthogonal projection of the boosting element onto a plane containing the ground plane layer overlaps the ground plane layer.

20 Claims, 11 Drawing Sheets

Related U.S. Application Data continuation of application No. 18/087,315, filed on Dec. 22, 2022, now abandoned, which is a continuation of application No. 17/244,486, filed on Apr. 29, 2021, now Pat. No. 11,563,461, which is a continuation of application No. 16/160,613, filed on Oct. 15, 2018, now Pat. No. 11,018,712, which is a continuation of application No. 15/404,969, filed on Jan. 12, 2017, now Pat. No. 10,122,403.

(60) Provisional application No. 62/277,541, filed on Jan. 12, 2016.

(58) Field of Classification Search
CPC .. H04B 1/0475; H04B 10/504; H04B 10/572; H04B 7/0404; H04B 1/0053
USPC ...................................................... 455/553.1
See application file for complete search history.

(56) References Cited

U.S. PATENT DOCUMENTS

| | | | |
|---|---|---|---|
| 7,911,402 | B2 | 3/2011 | Rowson et al. |
| 9,112,284 | B2 | 8/2015 | Andujar Linares et al. |
| 9,147,929 | B2 | 9/2015 | Anguera et al. |
| 9,276,307 | B2 | 3/2016 | Anguera Pros et al. |
| 9,331,389 | B2 | 5/2016 | Anguera Pros et al. |
| 9,350,070 | B2 | 5/2016 | Anguera Pros et al. |
| 9,379,443 | B2 | 6/2016 | Anguera Pros et al. |
| 9,577,325 | B2 | 2/2017 | Andujar Linares et al. |
| 9,660,690 | B2 | 5/2017 | Talty et al. |
| 9,838,056 | B2 | 12/2017 | Wloczysiak |
| 9,866,244 | B2 | 1/2018 | Srirattana et al. |
| 9,882,587 | B2 | 1/2018 | Feng et al. |
| 9,948,271 | B2 | 4/2018 | Srirattana et al. |
| 9,954,564 | B2 | 4/2018 | Little et al. |
| 9,960,478 | B2 | 5/2018 | Anguera Pros et al. |
| 9,985,809 | B2 | 5/2018 | Talty et al. |
| 10,141,655 | B2 | 11/2018 | Desclos et al. |
| 10,418,704 | B2 | 9/2019 | Pajona et al. |
| 10,505,272 | B2 | 12/2019 | Anguera Pros et al. |
| 11,769,941 | B2 | 9/2023 | Andujar Linares et al. |
| 2004/0095280 | A1 | 5/2004 | Poilasne et al. |
| 2007/0135122 | A1* | 6/2007 | Dillon ................ H04W 36/302 455/433 |
| 2010/0188300 | A1* | 7/2010 | Anguera ............. H01Q 9/0407 343/702 |
| 2010/0214493 | A1 | 8/2010 | Jonsson et al. |
| 2013/0187828 | A1 | 7/2013 | Desclos et al. |
| 2013/0325149 | A1* | 12/2013 | Manssen ............. H04B 1/0458 700/37 |
| 2013/0328410 | A1 | 12/2013 | Georgakopoulos et al. |
| 2013/0342416 | A1 | 12/2013 | Andujar Linares et al. |
| 2014/0015728 | A1* | 1/2014 | Anguera Pros ...... H01Q 9/0414 343/843 |
| 2014/0015730 | A1 | 1/2014 | Anguera Pros et al. |
| 2014/0306859 | A1 | 10/2014 | Desclos et al. |
| 2014/0327578 | A1 | 11/2014 | Rowson et al. |
| 2014/0375521 | A1 | 12/2014 | Andujar Linares et al. |
| 2016/0028152 | A1 | 1/2016 | Anguera Pros et al. |
| 2016/0111790 | A1 | 4/2016 | Anguera Pros et al. |
| 2016/0173172 | A1 | 6/2016 | Greene |
| 2017/0237151 | A1 | 8/2017 | Andujar Linares et al. |
| 2019/0260125 | A1 | 8/2019 | Linares et al. |
| 2024/0047859 | A1 | 2/2024 | Andujar Linares et al. |

FOREIGN PATENT DOCUMENTS

| | | | |
|---|---|---|---|
| EP | 2978069 | A1 | 1/2016 |
| JP | 2002223114 | | 8/2002 |
| JP | 2006279159 | | 10/2006 |
| KR | 101442063 | B1 | 9/2014 |
| KR | 101490156 | B1 | 2/2015 |
| WO | 2004047222 | A1 | 6/2004 |
| WO | 2010015364 | A2 | 2/2010 |
| WO | 2010015365 | A2 | 2/2010 |
| WO | 2014012796 | A1 | 1/2014 |
| WO | 2014165320 | A2 | 10/2014 |

OTHER PUBLICATIONS

AIRFDC™ Tunable Capacitor GSM, WCDMA, LTE 100 MHz to 3000 MHZ, product brief: EtherChip 1.0™, part No. EC10001, Ethertronics.

Akyildiz et al, The evolution 4G cellulars systems: LTE-Advanced, Physical Communication, 2010, No. 3, p. 217-244, Elsevier.

Ali et al, Design of a Multiband Internal Antenna for Third Generation Mobil, Transactions on Antennas and Propagation, 2003, vol. 51, pp. 1452-1461, IEEE.

Andujar, Aurora, et al., Ground plane boosters to provide multi-band operation in wireless handheld devices, Proceedings of the 5th European Conference on Antennas and Propagation, 2011, p. 599-603.

Andujar, Aurora, et al., Ground plane boosters as a compact antenna technology for wireless handheld devices, IEEE Transactions on Antennas and Propagation, May 2011, p. 1668-1677, vol. 59, No. 5.

Andujar, Aurora, Anguera, Jaume, On the radiofrequency system of ground plane booster antenna technology, Electronics Letters, Jul. 5, 2012, vol. 48 No. 14, 2p.

Andujar, Aurora, Anguera, Jaume, Magnetic boosters for multiband operations, Microwave and optical techNo. logy letters, Jan. 2013, p. 65-75, vol. 55, No. 1, Wiley Periodicals.

Andujar, Aurora, Anguera, Jaume, Non-resonant elements with a simplified radiofrequency system for handset devices, 7th European Conference on Antennas and Propagation, 2013, p. 1848-1851.

Andujar, Aurora, Ground plane booster antenna technology for wireless handheld devices, PhD Dissertation, May 2, 2013, 287 p., Barcelona-Spain, Department of Signal Theory and Communications, Universitat Politecnica de Catalunya, Technology and Intellectual Property Rights Department Fractus.

Andujar, Aurora, et al, Distributed systems robust to hand loading based on No. nresonant elements, Microwave and optical techNo. logy letters, Oct. 2013, p. 2307-2317, vol. 55, No. 10, Wiley Periodicals Inc.

Andujar, Aurora, et al, Virtual Antenna technology: the flexible and off-the-shelf mobile antenna solution, white paper, 2016, 13 p.

Anguera, Jaume, et al, Multiband and small coplanar antenna system for small wireless handheld devices, IEEE Transactions on Antennas and Propagation, Jul. 2013, p. 3782-3789, vol. 61, No. 7.

Anguera, Jaume, et al, Advances in antenna technology for wireless handheld devices, International Journal of Antennas and Propagation, vol. 2013, 25p., Hindawi Publishing Corp.

Blodgett, William, 3.5 to 30 MHz Automatic Antenna Impedance Matching System, thesis, 2012, 100p., California Polytechnic State University.

Buisman et al, "Distortion-Free" Varactor Diode Topologies for RF Adaptivity, conference paper, 2005, p. 157-160, IEEE.

Bujalance, A., Arquitecturas compactas y multibanda con tecnología de antena Ground Plane Booster, Universitat Ramon Llull-La Salle, 2014.

Caporal et al, Coupling Element Antenna with Slot Tuning for Handheld Devices At LTE Frequencies, 6th European Conference on Antennas and Propagation (EUCAP), 2011, p. 3587-3590, IEEE.

Caporal et al, Challenges for Frequency-Reconfigurable Antennas in Small Terminals, 2012, 5p., IEEE.

Chen et al, Analog Tunable Matching Network Using Integrated Thin-Film BST Capacitors, MTT-S Digest, 2004, 261-264, IEEE.

Cobo, Yolanda, MIMO system combining a PIFA antenna and ground plane booster anthena technology, thesis, 2014, 194 p., Escola Tècnica Superior d'Enginyeria Electrònica i Informàtica La Salle.

Diaz, Víctor, Multiband MIMO techniques for handset devices based on ground plane boosters, thesis, 2010, 179 p., Escola Tècnica Superior d'Enginyeria Electrònica i Informàtica La Salle.

(56) References Cited

OTHER PUBLICATIONS

Garcia Martos, Carlos, Analysis and design of planar antennas thumbnail-multiband wireless platform, thesis, 2012, 119 p., Escola Universitària d'Enginyeria Tècnica de Telecomunicació La Salle.
Goldsmith et al, RF MEMs Variable Capacitors for Tunable Filters, International Journal of RF and Microwave Computer-aided Engineering, Jul. 1999, p. 362-374, vol. 9, Issue 4, John Wiley & Sons.
Góngora, Sheila, Compact architectures of ground plane boosters for laptop and smartphone platforms, thesis, 2012, 129 p., Universitat Ramon Llull-La Salle.
Hallberg, Linus, Tunable WWNA-LTE Handset Antenna and its LTE MIMO Application, thesis, 2012, 52p., Chalmers University of Technology, Gothenburg, Sweden.
Ikonen et al, Multi-feed RF front-ends and cellular antennas for next generation smartphones, technical paper, 2012,11p., Indie Operator Independent Hardware.
Ilvonen et al, Design Strategy for 4G Handset Antennas and a Multiband Hybrid Antenna, Transactions on antennas and propagation, Apr. 2014, p. 1918-1927, vol. 62, No. 4, IEEE.
Lee et al, Matching network using one control element for widely tunable antennas, Progress In Electromagnetics Research C, 2012, vol. 26, p. 29-42.
Nguyen et al, A Compact Tunable Internal Antenna for Personal Communicaction Handsets, Antennas And Wireless Propagation Letters, 2008, p. 569-572, vol. 7, IEEE.
Picher, Cristina, et al, Non-resonant element in slotted ground plane for multiband antenna operation, Etri journal, Oct. 2014, vol. 36, No. 5, p. 835-840.
Picher, Cristina, et al, Concentrated ground plane booster antenna techonology for multiband operation in handset devices, Radioengineering, Dec. 2014, vol. 23, No. 4, p. 1061-1070.
Pokorny et al, LTE Tunable Antenna Design, 7th European Conference on Antennas and Propagation (EuCAP), 2013, 847-850, IEEE.
Pokorny, Michal, Tunable Dual-Band Antenna for Agile Communication Handsets, Loughborough Antennas & Propagation Conference, Nov. 12-13, 2012, Loughborough, UK, IEEE.
Rahola et al, Using the Concept of Obtainable Efficiency Bandwidth to Study Tunable Matching Circuits, 6th European Conference on Antennas and Propagation (EUCAP), 2011, p. 1869-1872, IEEE.
Ranta et al, New tunable technology for mobile-tv antennas, Microwave Journal, Nov. 2008, 4p.
Ranta, et al, RF front end adapts for increased mobile data demand, EE Times, Oct. 2010, 9p.
Rebeiz, Gabriel, RF MEMS Switches and Tuners: Commercialization trends and business opportunities, MEMS Business Forum, May 2012, 31p., University of California.
Roessler et al, LTE-Advanced (3GPP Rel.11) Technology Introduction, white paper, Jul. 2013, Rohde & Schwarz.
Qorvo White Paper: "Overcoming the RF Challenges of Full-Screen Smartphones," www.qorvo.com, pp. 1-7 (Feb. 2018).
Saraereh, et al, Multi-band Handset Antenna Design Using a Genetic Algorithm, International ITG Conference on Antennas, 2003, 4p.
Shamblin, Jeff, Making active antenna systems a reality, Antenna Systems & Technologies, 2012, p. 10.
Sheele el at, Continuously Tunable Impedance Matching Network Using , Ferroelectric Varactors, 2005, p. 603-666, IEEE.
Sidhwani, Reema, Antenna Tunning for WCDMA RF Front End, thesis, 2012, 70p., Aalto University.
Song et al, Antennas, how many do we need?, 10p., Quintel Technology Limited.
Valkonen, Risto, Impedance matching and tuning of non-resonant mobile terminal antennas, doctoral dissertation, 2013, No. 40, 94p., Aalto University.
Walsh, Kevin, RF Switches Guide Signals in Smart Phones, Microwaves & RF, Sep. 2010, 9p.

Whatley et al, RF Front-End Tunability for LTE Handset Applications, 2010, 4p., IEEE.
1.2 pF Passive Tunable Integrated Circuits (PTIC), CN semiconductor product datasheet, May 2013, publication order No. TCP3012H/D, Semiconductor Components Industries.
5.6 pF Passive Tunable Integrated Circuits (PTIC), CN semiconductor product datasheet, May 2013, publication order No. TCP3056H/D, Semiconductor Components Industries.
4G LTE, datasheet, 2013, TriQuint Semiconductor.
856931 710/740 MHz Duplexer, datasheet, 2011, TriQuint Semiconductor.
Adjustable LTE antenna, datasheet, 2011, Pulse Electronics.
CXM3582UR SP10T Antenna Switch Module 6TRx/2Tx/2Rx, datasheet, Sony.
DTAD.01.A.50 specification, datasheet, SPE-13-8-041/B/RC, Taoglas Ltd.
EtherBook 1.0 LTE Antenna for Notebooks, product data sheet: EtherBook 1.0TM, 2012, Ethertronics.
EtherModule 1.0™, product data sheet: EtherModule 1.0™, 2013, Ethertronics.
EtherSmart LTE 1.0 Phone Adaptive AntennaTM, product data sheet: EtherSmart Lte 1.0TM, 2012, Ethertronics.
Ether Switch&Tune™ AFE Chip, product brief: EtherChip 2.0™, part No. EC2A011, Ethertronics.
Mobile devices products, datasheet, 2013, TriQuint Semiconductor.
RF6276 3V 700 MHz LTE linear power amplifier, datasheet, 2006, RFMD.
RFRD6461 3G Powersmart™ power platform, datasheet, 2012, RFMD.
RF Products for Cellular Data Applications, datasheet, 2012, RFMD.
SKY14152: 0.40-2.17 GHz SP8T Antenna Switch Front-End Module With GSM/DCS Filter, datasheet, Jun. 2, 2010, Skyworks Solutions.
SKY77458 Front-End Module for LTE / EUTRAN Band VIII (Tx 880-915 MHZ), (Rx 925-960 MHZ), datasheet, Jun. 8, 2010, Skyworks Solutions.
SKY77806 Multiband Front-End Module for LTE Bands 12 / 17, 13, datasheet, May 17, 2013, Skyworks Solutions.
STHVDAC-303 High voltage BST capacitance controller, datasheet production data, Nov. 2012, Doc ID 18317 Rev 3, ST.com.
STPTIC Parascan™ tunable integrated capacitor, datasheet production data, Jul. 2013, DocID023772 Rev 2, ST.com.
UltraCMOS® Digitally Tunable Capacitor (DTC) 100-3000 MHZ, product brief PE64905, 2012, document No. 70-0359-05, Peregrine Semiconductor Corp.
UltraCMOS® Digitally Tunable Capacitor (DTC)100-3000 Mhz, PE64909 product specification, 2013, document No. DOC-30414-2, Peregrine Semiconductor Corp.
WS2017 Tunable Impedance Matching Network with SPI interface, WiSpry.
WS2018 Tunable Impedance Matching Network with Mipi Rffe interface, Wispry,.
Andujar, Aurora, et al., Ground Plane Boosters as a Compact Antenna Technology for Wireless Handheld Devices, IEEE Transactions on Antennas and Propagation, vol. 59, No. 5, pp. 1668-1677, 2011.
Leiva, José Luis, Análisis y Diseño de Sistemas Distribuidos Basados en la Tecnología de Booster con Software SEMCAD (Final degree project), Escola Tecnica Superior d'Enginyeria Electronica i Informatica La Salle, 2014.
Andujar, Aurora, et al., Human Head Interaction Over Ground Plane Booster Antenna Technology: Functional and Biological Analysis, Progress In Electromagnetics Research B, vol. 41, 153-185, 2012.
U.S. Appl. No. 12/669,147—Notice of allowance dated Feb. 22, 2012, USPTO, Feb. 22, 2012.
U.S. Appl. No. 12/669,928—Notice of allowance dated on Apr. 12, 2012, USPTO, Apr. 12, 2012.

* cited by examiner

WIRELESS DEVICE

CROSS REFERENCE TO RELATED APPLICATIONS

This application is a continuation of U.S. patent application Ser. No. 18/450,046 filed Aug. 15, 2023, which is a continuation of U.S. patent application Ser. No. 18/087,315 filed Dec. 22, 2022, now abandoned, which is a continuation of U.S. patent application Ser. No. 17/244,486 filed Apr. 29, 2021, now U.S. Pat. No. 11,563,461, issued Jan. 24, 2023, which is a continuation of U.S. patent application Ser. No. 16/160,613 filed Oct. 15, 2018, now U.S. Pat. No. 11,018,712, issued on May 25, 2021, which is a continuation of U.S. patent application Ser. No. 15/404,969 filed Jan. 12, 2017, now U.S. Pat. No. 10,122,403, issued on Nov. 6, 2018, which claims priority under 35 U.S.C. § 119 (e) from U.S. Provisional Patent Application Ser. No. 62/277,541, filed Jan. 12, 2016, the entire contents of which are hereby incorporated by reference.

FIELD OF THE INVENTION

The present invention relates to the field of wireless devices, for example wireless portable and/or handheld devices which require the transmission and reception of electromagnetic wave signals and to a radiating system for such wireless devices.

BACKGROUND

Wireless devices and radiating systems for them typically operate one or more cellular communication standards and/or wireless connectivity standards, each standard being allocated in one or more frequency bands, and said frequency bands being contained within one or more regions of the electromagnetic spectrum. Examples for such wireless devices include a mobile phone, a smartphone, a PDA, an MP3 player, a headset, a USB dongle, a laptop computer, a gaming device, a digital camera, a PCMCIA or Cardbus 32 card, or generally a multifunction wireless device.

The invention relates in particular to wireless devices (and radiating systems), which can perform in two or more separate frequency regions (bands) of the electromagnetic spectrum. They are generally referred to as multi-band devices (radiating systems), and are in particular for example referred to as dual-band (working in two frequency bands), tri-band (working in three frequency bands), quad-band (working and four frequency bands) and penta-band (working in five frequency bands). Standards, according to which such wireless devices (radiating systems) may operate, comprise for example UMTS, GSM (e.g., GMS850, GSM900, GSM1800, GSM1900) and LTE (e.g., LTE700, LTE2300, LTE2500). The necessary frequency bands may thus, for example, comprise the frequency regions in the areas from 800 MHZ to 960 MHz and from 1710 MHz to 2690 MHz, or from 698 MHz to 960 MHz and from 1710 to 2690 MHZ.

It is known in the art to use wireless devices (radiating systems) that do not require the use of a separate antenna element, but rather use a ground plane layer providing a determined radioelectric performance in one or more frequency regions of the electromagnetic spectrum. Such devices are also referred to as antennaless devices because they do not have a separate antenna element. Such devices (radiating systems) are, for example, known from co-owned applications WO2010/15365, WO2010/15364, WO 2014/012796 and U.S. Ser. No. 14/807,449. The disclosures of the aforementioned co-owned applications are herewith incorporated by reference in their entirety. In case of conflict, the present specification, including definitions, will control.

Such (antennaless) devices typically comprise a radiating system capable of transmitting and receiving electromagnetic wave signals in at least two frequency regions. The radiating system comprises a radiating structure comprising at least one ground plane layer and at least one boosting element. The radiating system further comprises a radiofrequency system. The radiofrequency system is suitable to modify the impedance of the radiating structure to provide impedance matching to the radiating system in the at least first and second frequency regions of operation of the radiating system.

In well matched radiating systems, the reflection coefficient may have a value of approximately −4 dB or less, for example −4.5 dB or less, in particular −6 dB or less in the frequency region in which the wireless device operates. In other well matched radiating systems, the voltage standing wave ratio (VSWR) may be 4.5 or less, in particular 4 or less. Such radiofrequency systems typically provide their impedance matching by using a radiofrequency system with long and complex matching networks of electronic components comprising a large number of passive reactive components, for example 6 or more components. Such radiofrequency systems are known, for example, from the above-mentioned, co-owned applications. In addition to the matching network, the radiofrequency system may, for example, comprise additional switches, diodes or other elements or no other elements, i.e., the radiofrequency system may consist of the matching network.

SUMMARY

The invention comprises a wireless multi-band device comprising a radiating system capable of transmitting and receiving electromagnetic wave signals in at least two frequency regions (frequency bands), the radiating system comprising a radiating structure comprising at least one ground plane layer and at least one boosting element and a radiofrequency system suitable to modify the impedance of the radiating structure, thus providing impedance matching to the radiating system in the at least first and second frequency regions of operation of the radiating system, wherein the radiofrequency system comprises a tunable reactive element. In particular, the tunable reactive element may be comprised in the matching network, wherein the matching network is comprised by the radiofrequency system. Such a matching network may be used because the boosting element or boosting elements may be (severely) out of tune for the frequency regions in which the wireless device is designed to operate.

Examples for radiating structures which may be used in a wireless multi-band device (also referred to as wireless device in the following) can, for example, be seen in FIGS. 4, 8, 12, 17, 19 and 21 to 25 of WO2010/015365.

Examples for boosting elements which may be used in a radiating system comprise radiation boosters as disclosed in WO 2010/015365, for example radiation boosters as shown in FIGS. 16, 19, 20, 23. Other boosting elements which may be used in the radiating system are also sold under the name mXTEND™, BAR mXTEND™, RUN mXTEND™ antenna boosters. For example, such a radiation booster, antenna booster or boosting element may (for example in all directions or in three directions which are each orthogonal to the other) have a maximum size (extension) of smaller than 1/30 or 1/50 times the free-space wavelength corresponding to the lowest frequency of the lowest frequency band in which the wireless multi-band device is configured to perform. They may, for example, in all directions of space have an extension (length) of smaller than 1/30 or 1/50 times the free-space wavelength corresponding to the lowest frequency of the lowest frequency band in which the wireless multi-band device is configured to perform. Such radiation boosters or antenna boosters may not radiate significantly themselves. For example, their own radiation my result in a radiation efficiency below 35% when they are mounted and tested on a large ground plane (e.g., larger than a wavelength in diameter or side for the longest operating wavelength, for instance a 600 mm×600 mm squared ground plane) in a vertical monopole configuration at the center of such a ground plane. In some cases, radiation boosters or antenna boosters might feature a radiation efficiency as low as 10%, 5%, 2% or even lower when tested in those conditions at the longest operating wavelength. The longest operating wavelength is the free-space wavelength corresponding to the lowest frequency of the lowest frequency band in which the wireless multi-band device is configured to perform. The radiation booster or antenna booster may, under these conditions, be so poorly matched (no matching network included in such a test), that the overall antenna efficiency (i.e., including the mismatch loss in the efficiency computation) might be as low as 5% or lower, or even below 1% or 0.5% at the longest operating wavelength.

Other examples for boosting elements may be larger and have some contribution to the radiation on their own. They may, for example, be at the edge of booster technology and at the edge of antenna technology. For example, they may have a size between 1/6 and 1/30 of the longest operating wavelength (i.e., their length in all directions of space may have an extension (length) of smaller than between 1/6 and 1/30 times the free-space wavelength corresponding to the lowest frequency of the lowest frequency band in which the wireless multi-band device is configured to perform), and feature a radiation efficiency between 20% and 50% and an antenna efficiency between 10% and 35% when tested as a vertical monopole in a large ground plane (e.g., 600×600 mm) as in the conditions as set above. This is in contrast with typical antennas that are typically a quarter wavelength or longer and may feature a radiation efficiency above 50%.

One, two, three or more boosting elements, for example radiation boosters or antenna boosters, may be used in a radiating system, in particular the matching network comprised by the radiating system. Each of them may be configured as the above-mentioned radiation boosters of the prior art or one of the other mentioned examples. Optionally, in a system comprising two or more or exactly two boosting elements, these may be interconnected by a lumped reactive component, e.g., an inductor or a capacitor. In some embodiments, one boosting element only may be comprised in the radiating system.

With such a tunable reactive element, the number of components used in the radiofrequency system, in particular in the matching network, may be reduced and/or the number of necessary boosting elements may be reduced and/or improved impedance matching may be provided.

For example, only one boosting element and a radiofrequency system comprising a matching network with two or three reactive components comprising (at least) one tunable reactive component may be sufficient to match the radiating system in two frequency regions.

In particular, a tunable reactive element may allow adjusting of the working frequency by changing the tunable reactive element, shifting the frequency on which the wireless device (radiating system) works best to the preferred frequency area, for example a particular band or a channel thereof (each frequency band may comprise several channels in which devices can communicate with each other).

In particular, it may allow obtaining a radiating system working across a wide range of mobile/wireless frequency bands and/or it may make the design of the system easier due to fewer components. The system may be more stable in view of the fact that with a larger number of components, the tolerances of the components add up, and that the overall radiation efficiency of the entire radiating system increases as the number of components decreases. Due to the reduced mismatch, the corresponding losses may be reduced, for example from 6 dB to 10 dB, resulting in an increased ground-plane antenna efficiency, for example in the amount from 75% to 90% or approximately 1 dB in improvement.

A tunable reactive element in a radiating system, in particular in the matching network, may allow further reduction of the size of the boosting elements, reducing the necessary clearance area around the boosting elements, and it may allow overlapping boosting elements onto the ground plane layer to use small ground planes and platforms due to the reduced number of elements. This may, in particular, lead to smaller radiating systems and smaller wireless devices. In known systems, (severely) reducing the clearance area around a boosting element may result in a reduction of the impedance bandwidth of the system and may result in an unacceptable bandwidth in passive, fixed systems. With a tunable reactive element in the radiating system, such a narrower bandwidth can be moved and located with the tuning mechanism (e.g., by self-tuning) to the frequency region of interest, i.e., the frequency region of operation. This may be sufficient because a passive, fixed system typically does not use the entire bandwidth at the same time.

Such a tunable reactive element may, for example, comprise or be a tunable (i.e., variable) capacitor. Possible capacitors that may be used in such a radiating system may have a capacity in a range or comprising a range from 0.6 pF to 2.35 pF or may have a capacity comprising part of said range. Possible tunable capacitors which may, for example, be used comprise Cavendish SmarTune™ Antenna Tuners, e.g., 32CK301, 32CK417, 32CK402, 32CK503, 32CK505, Peregrine e.g., PE64905, PE64909, ON Semiconductor-ParaScan or TCP-3012H.

Alternatively or additionally, such a tunable reactive element may comprise or be a tunable inductor. Such tunable inductors may, for example, be implemented by using a switch and a bank of fixed inductors. They may have an inductivity in a range or comprising a range from 2 nH to 30 nH or may have an inductivity comprising part of said range.

For example, a radiofrequency system or the matching network comprised by it may comprise a passive reactive component and a tunable reactive component. In some examples, the radiofrequency system or the matching network comprised by it may consist of one passive reactive component and one tunable reactive component, i.e., it may not comprise any other reactive components. The passive reactive component(s) may optionally be lumped component(s). These components may be arranged in parallel in the radiofrequency system or the matching network comprised by it. In other embodiments, they may be arranged in series.

In other examples, a radiofrequency system or the matching network comprised by it may comprise two passive reactive components and a tunable reactive component. These passive reactive components may optionally be lumped components. In some examples, the radiofrequency system or the matching network comprised by it may consist of two passive reactive components and one tunable reactive component, i.e., it may not comprise any other reactive components. For example, one passive component may be switched in series with parallel arrangement of another passive reactive and the tunable reactive component.

The wireless device may be programmed to self-tune itself whenever the detected performance is below a certain threshold. For example, when a user (or a disrupting device) blocks a boosting element or modifies the frequency by influencing the wireless device in some other manner (for example by hand or finger blocking the booster), the system may notice a reduction in performance and self-tuning may adjust the system such that the performance is improved. For example, the wireless device may be programmed to measure the total received power and/or the total radiated power and, when measuring a reduction in performance, to self-tune the radiating system. In another example, the wireless device may be programmed to self-tune by changing the tunable reactive component in search for a maximum of the total received power and/or the total radiated power in certain time intervals or according to a trigger event.

Wireless devices (radiating systems) may, in particular, be antennaless, i.e., they may not have a separate antenna element in addition to the ground plane layer. Such antennaless configurations with a radiofrequency system suitable to modify the impedance of the radiating structure, providing impedance matching to the radiating system in the at least first and second frequency regions of operation of the radiating system, are known from the prior art, in particular the co-owned applications mentioned above.

A wireless multi-band device (radiating system) may comprise a control mechanism for controlling the tunable reactive element. The control mechanism may be adapted for tuning the tunable reactive element such that the wireless device operates in an (at least one) intended frequency band by changing the reactivity of the tunable reactive element.

The information about the intended frequency band may be provided by a user and/or found from signals received by the wireless device. Alternatively or in addition, the control device may be adapted to self-tune the wireless device, for example when the detected performance is below a certain threshold or changes during wireless communication with another device.

The control mechanism may, for example, direct the self-tuning of the wireless device by receiving information about an intended frequency band and/or performance of the wireless device, processing this information and tuning the tunable reactive element based on the received information. The control mechanism may comprise computer-readable instructions saved on a computer-readable device that, when carried out by a processor or microprocessor (for example a processor or microprocessor comprised in the wireless multi-band device) direct the wireless multi-band device to carry out the above described method steps of receiving information about an intended frequency band and/or performance of the wireless device, processing these information and tuning the tunable reactive element based on the received information.

The invention also comprises a multi-band radiating system (for use in a wireless device) comprising a ground plane layer, a boosting element and a radiofrequency system characterized in that the radiofrequency system comprises a tunable reactive element. Such a multi-band radiating system may in particular be a radiating system as described above, and may be configured as a radiating system described above.

For example, it may be capable of transmitting and receiving electromagnetic wave signals in at least two frequency regions (frequency bands) and/or may comprise a tunable capacitor and/or a tunable inductor, and/or its tunable reactive element may consist of a tunable capacitor or tunable inductor. The multi-band radiating system may be antennaless, i.e., they may not have a separate antenna element in addition to the ground plane layer and/or may comprise a boosting element which is smaller than 1/30 time the free-space wavelength corresponding to the lowest frequency of the lowest frequency band in which the multi-band radiating system is configured to perform and/or the radiofrequency system may consist of one or two passive and a tunable reactive element and/or its tunable reactive element may be adapted to be tuned by a control mechanism adapted for tuning it such that the wireless device operates in an intended frequency range.

The values to be used for the particular components to be used in a system, e.g., depending on the ground plane shape and size, the used boosting element and other known parameters may, for example, be found using ordinary tools for simulating such systems, e.g., CAD tools such as Microwave Office.

For example, for a (very small) boosting element, in a first stage of determining the values, a first inductor may be used to place the resonance frequency in between the high and low frequency regions (e.g., between 699-960 MHz and 1710-2690 MHZ). In a second stage, a pair of a passive inductor and tunable capacitor (or other tunable combination of two reactive elements, e.g., of a tunable inductor and a passive capacitor or a combination of a tunable inductor and a tunable capacitor) may be used to fine-tune the impedance of the system in the two regions. A CAD tool may be used to select the range of values of the tunable element(s) to finely match the impedance in the desired regions. In other examples, the inductor used in the first step may be tunable or an (optionally tunable) capacitor or an (optionally tunable) combination of reactive elements may be used instead of the (optionally tunable) inductor. Correspondingly, in the second stage, one (optionally tunable) reactive component may be used instead of a combination.

BRIEF DESCRIPTION OF THE DRAWINGS

Some embodiments will now be described with reference to the figures.

DETAILED DESCRIPTION

Figure 1A:
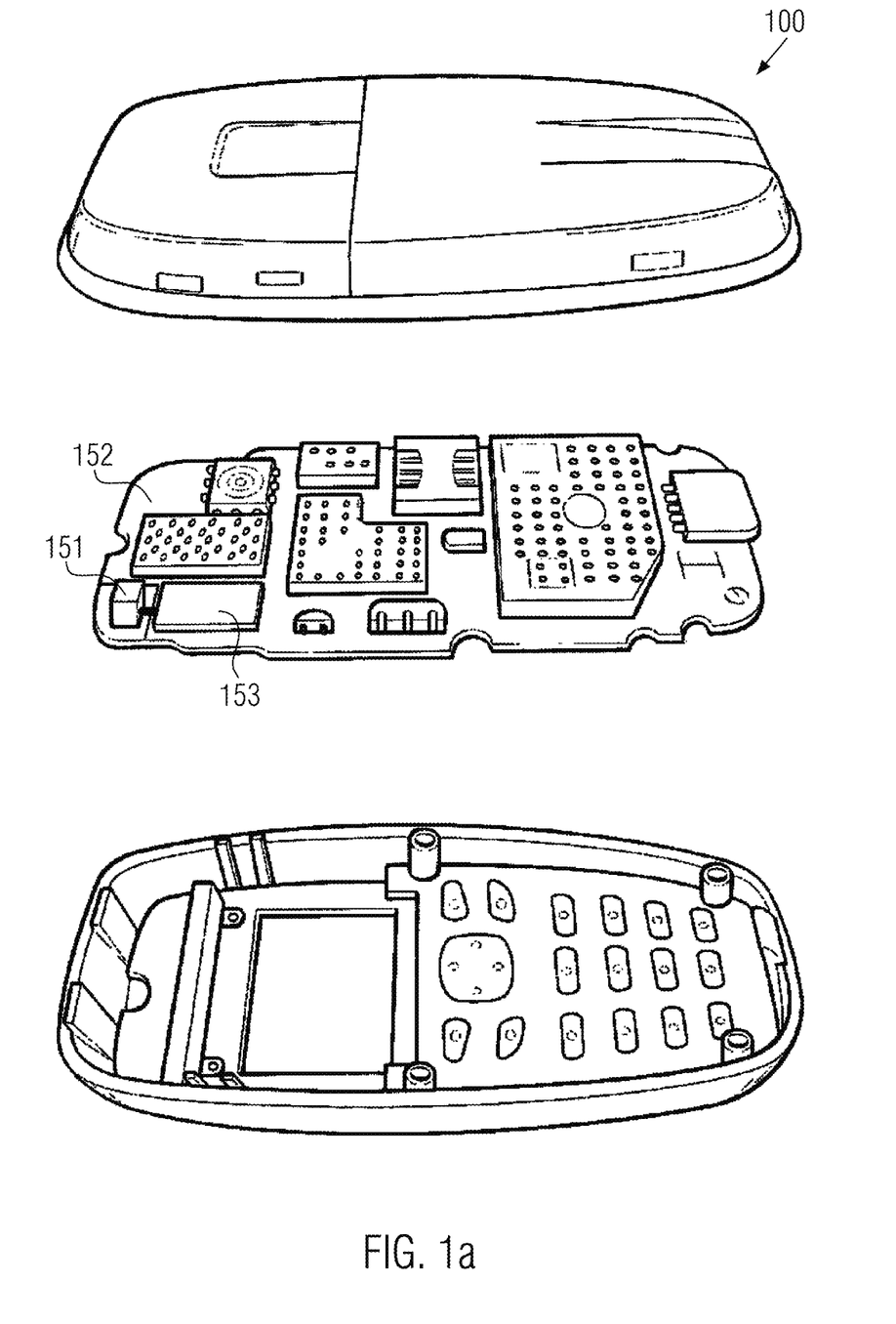
FIG. 1a shows an example for a wireless device 100 comprising a ground plane layer 152, a radiation booster 151 and a radiofrequency system 153.

FIG. 1a shows a wireless device 100. In this particular example, the wireless device is a cell phone comprising a radiating system with a ground plane layer 152, a boosting element 151 and a radiofrequency system 153. The particular example shown in FIG. 1a is antennaless, i.e., it does not have a separate antenna element in addition to the ground plane layer. In other embodiments, the wireless device may be a different wireless device, for example one of the wireless devices mentioned above.

Figure 1B:
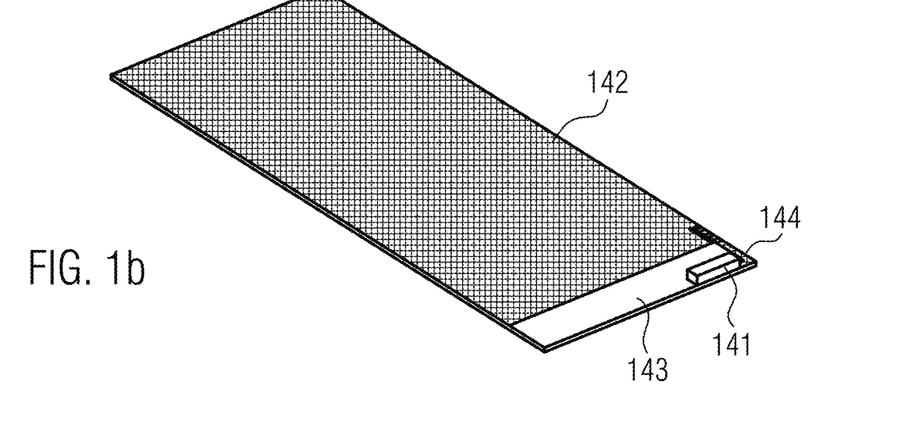
FIGS. 1b, 1c, and 1d show different examples for ground plane layers that may be used in a wireless device according to the invention.
Figure 1C:
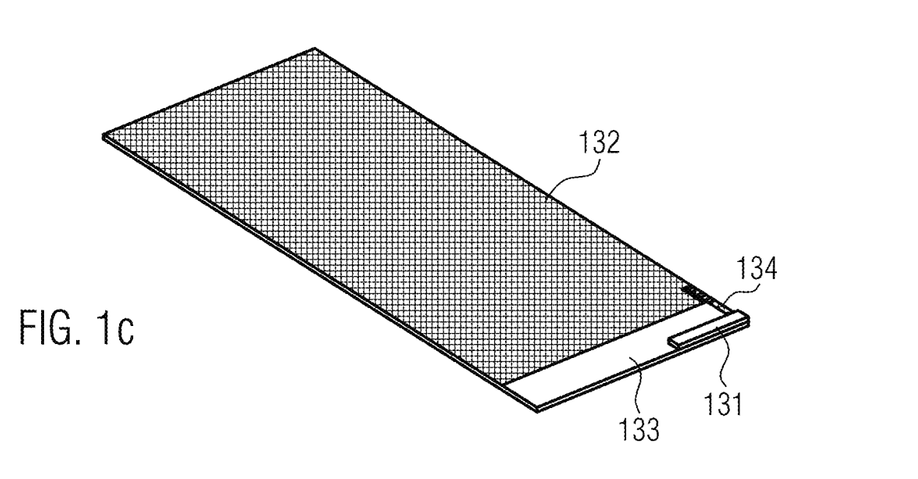

FIGS. 1b and 1c show examples for ground plane layer and boosting element arrangements which can be used in exemplary wireless multi-band devices.

For example, ground plane layers used in radiating systems may have a size between 100 mm and 160 mm in one direction (length) and between 40 mm and 80 mm in a direction perpendicular to it (width). Ground plane layers typically have, i.e., for example, less than 1/10 of the width and/or length, for example, less than 1/100 of the width and/or length. Ground plane layers used in smartphones may, for example have a size between 50 to 60 mm in width and between 120 and 150 mm in length. They may, for example, have a rectangular shape.

The ground plane layer may be printed on a dielectric layer or material. The dielectric layer may, for example, be between 0.5 mm and 4 mm high. As long as the ground plane layer fits on the dielectric layer, its length and width can have arbitrary values in any size. Typically, both length and width of the dielectric layer are much larger than the height of the dielectric layer, for example it may have a width of between 40 mm and 120 mm and a height between 100 mm and 180 mm. If a dielectric material is used, it typically has a flat surface in at least the area to which the ground plane layer is printed. Dielectric layers and materials which may be used for this may, for example, comprise FR4 or other similar materials, and these materials may have a relative permittivity (dielectric constant) of between 3.8 and 4.5, for example a relative permittivity of approximately 4.15. The tangent of the loss angle δ (tan δ) of the dielectric layer or material may have a value in an area between 0.005 and 0.03, in particular between 0.011 and 0.015, in particular for example approximately 0.013.

The boosting elements may have a greatest length of between, for example, 15 mm and 35 mm.

In the example of FIG. 1b, the ground plane layer 142 may have a size of approximately 120 mm in length and 60 mm in width and may, for example, be printed on a 1 mm high FR4 layer with a permittivity of approximately 4.15. The tangent of the loss angle & may approximately be 0.013 (tan δ=0.013). Other sizes for the ground plane layer and/or the boosting element and/or the ground plane layer being printed on a different material are also comprised by the invention.

FIG. 1b also shows an exemplary clearance area 143 around the boosting element 141 which extends along nearly the entire width of the ground plane layer 142 (with the exception of a small strip 144). Such a small strip 144 may have in one direction (e.g., its width, which along the same direction as the width of the ground plane layer) an extension of less than 1/10 of the width of the clearance area 143 (width again considered in the same direction as the width of the ground plane layer). This small strip 144 serves to connect the boosting element 141 with the ground plane layer 142. The strip may, for example, have a substantially straight or L-shaped form. It may follow the external contour of a printed circuit board (PCB) on which it may be present. In some embodiments, a portion of the strip may be curved to follow a path around a mechanical obstacle such as a screw, a post, an electronic component or the like.

The boosting element 141 may have dimensions of between 10 mm to 14 mm by 1 mm to 5 mm by 0.4 mm to 4.4 mm. For example, it may be a RUN Antenna booster, and it may have dimensions of approximately 12 mm×3 mm×2.4 mm in the particular example shown in FIG. 1b.

Figure 2A:
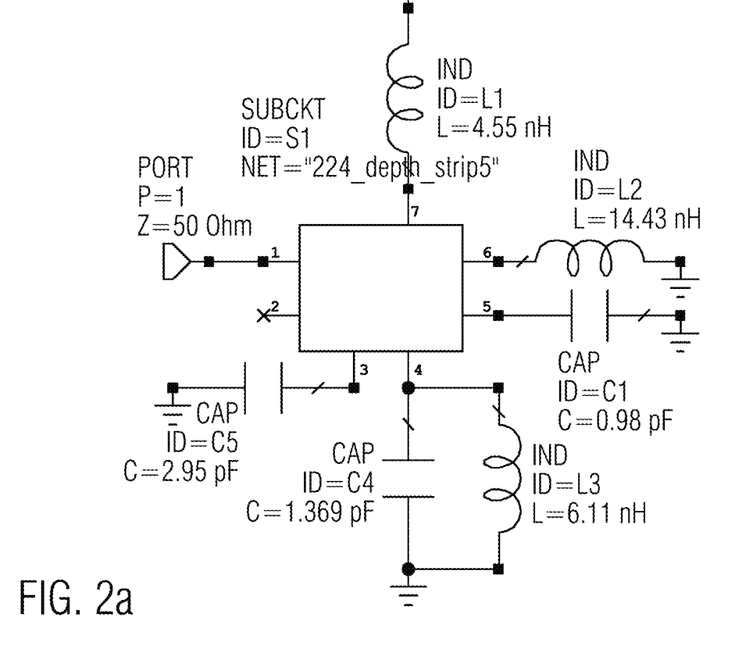
FIG. 2a shows a radiofrequency system according to the prior art.

To match such a radiating system as shown in FIG. 1b, for example for the frequency regions 824-960 MHz and 1710-2690 MHz, six passive components are needed. In FIG. 2a, an example for a prior art radiofrequency system is shown. The indicated capacities and inductivities are exemplary. Other values may be used in other embodiments.

Figures 2B, 2C:
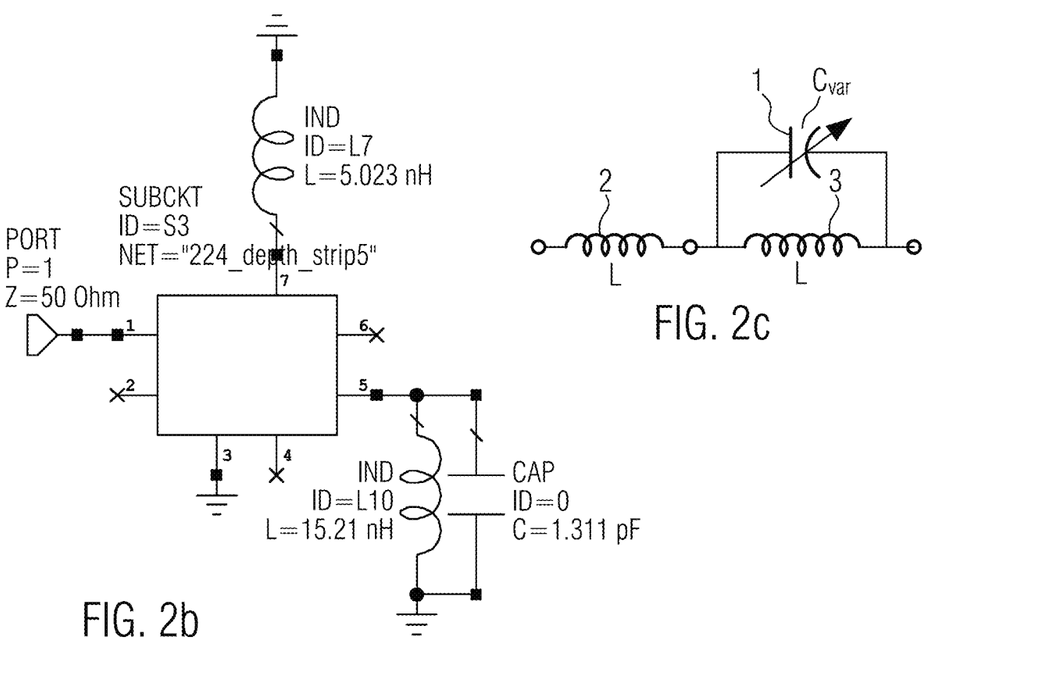
FIGS. 2b and 2c show radiofrequency systems which may be used in a wireless device according to the present invention.

FIG. 2b shows a radiofrequency system with a tunable capacitor. This can, for example, be used for matching a system as shown in FIG. 1b. In the system shown in FIG. 2b, the capacitor is tunable (the value of 1.311 pF is only one example for possible values).

FIG. 2c shows schematically how to couple three reactive elements 1, 2 and 3 for a radiofrequency system, wherein one is a tunable capacitor 1 (variable capacitor $C_{var}$) and two are passive reactive components, in this case inductors 2 and 3, in order to provide a radiofrequency system for a radiating system according to FIG. 1b. In particular, the left connection point of FIG. 2c may be connected with the boosting element. The right connection point may be connected to the transceiver or input/output of the radiofrequency system of the wireless device.

Here, the inductor 2 is coupled in series with a system comprising a parallel arrangement of an inductor 3 and the tunable capacitor 1.

FIGS. 3a to 3f show how the reflection coefficient changes depending on the capacitance value of the tunable capacitor.

In particular, FIGS. 3a to 3f each show a comparison of a reflection coefficient for a radiofrequency system as of FIG. 2a (marked by X) with the reflection coefficient achieved with a matching system according to FIG. 2b (marked by rectangles) for a single value of capacitance of the tunable capacitor.

Figure 3A:
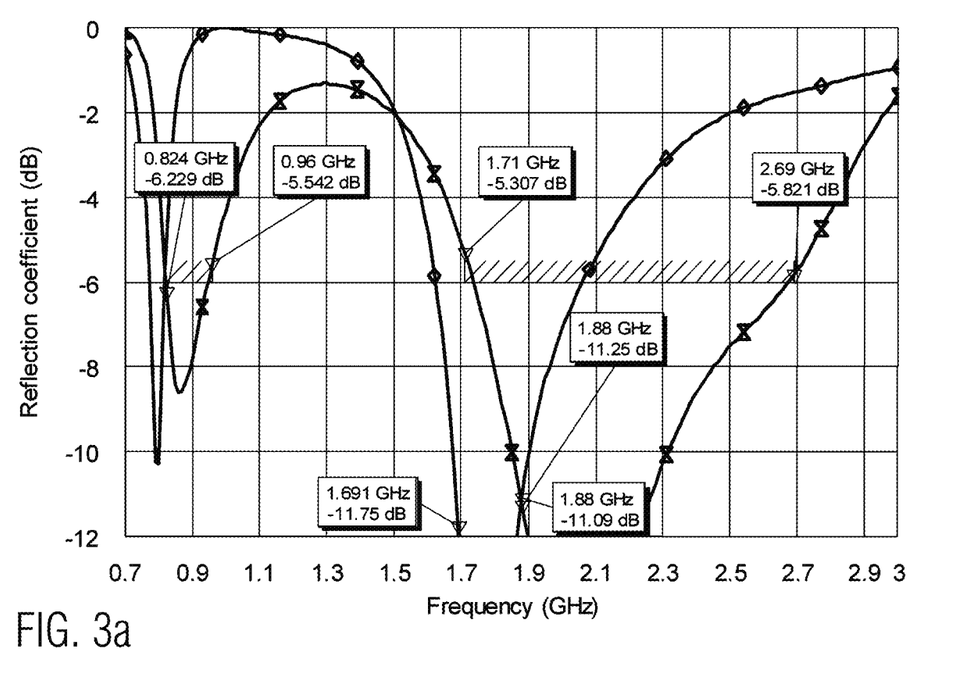
FIGS. 3a, 3b, 3c, 3d, 3e and 3f show a comparison of a reflection coefficient of the prior art with reflection coefficient of a radiofrequency system tuned to different values.
Figure 3B:
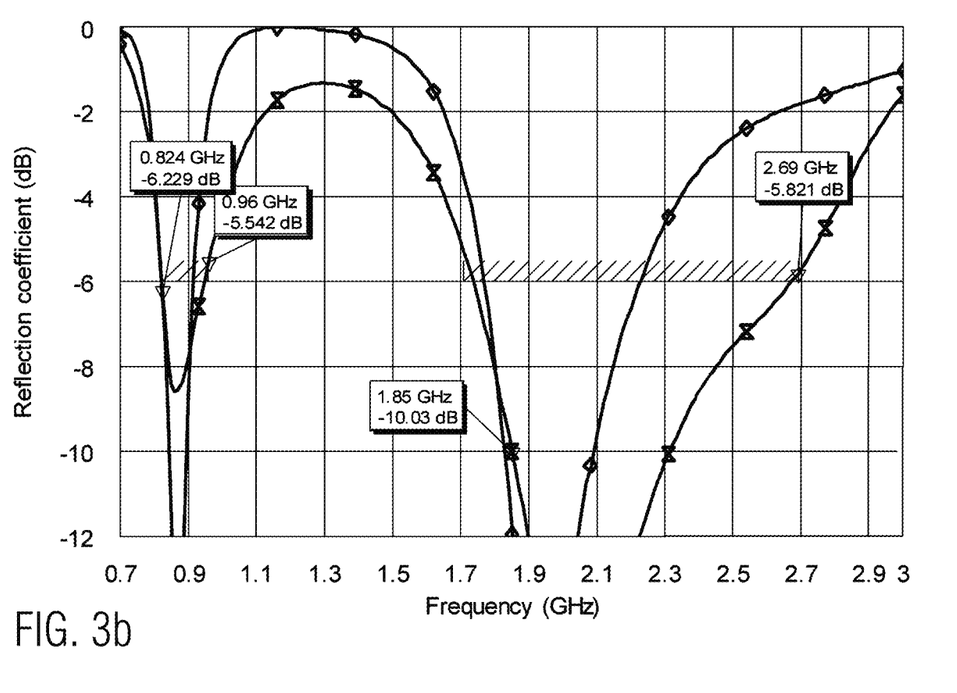
Figure 3C:
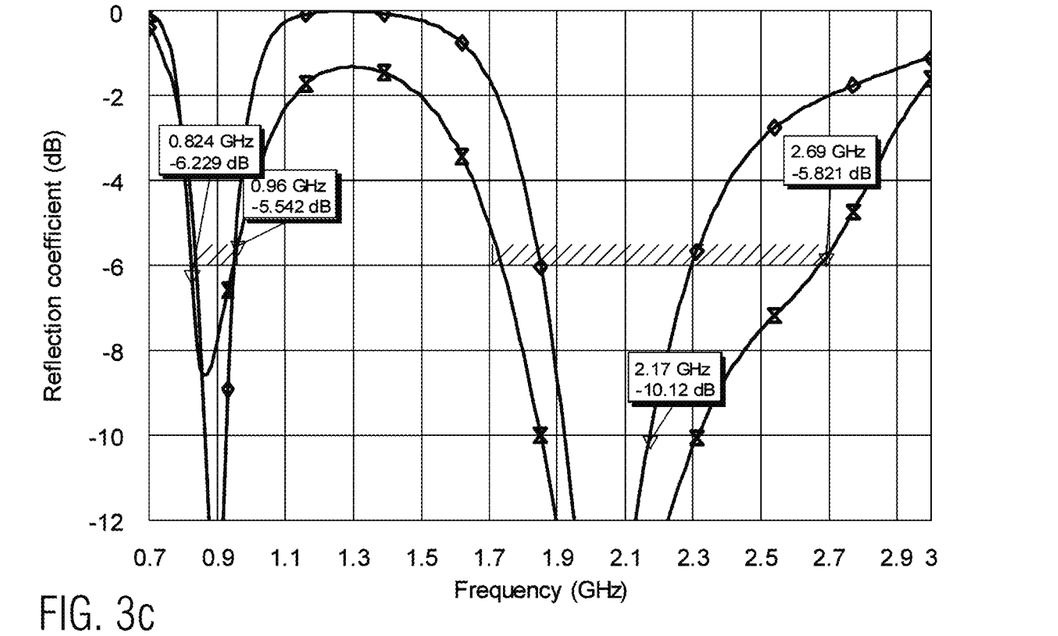
Figure 3D:
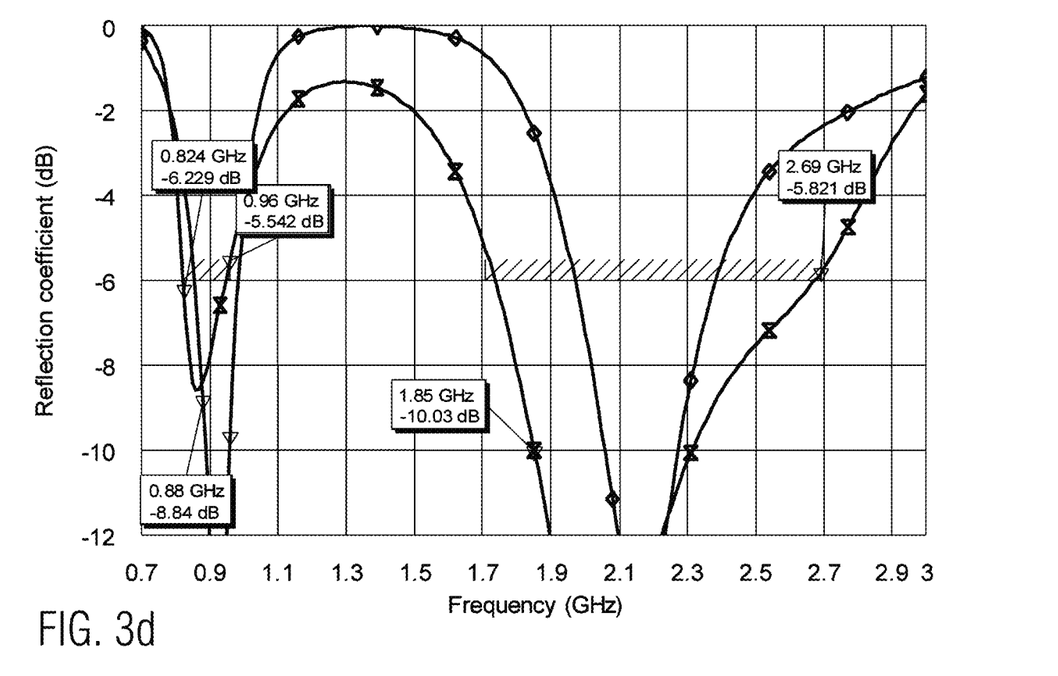
Figure 3E:
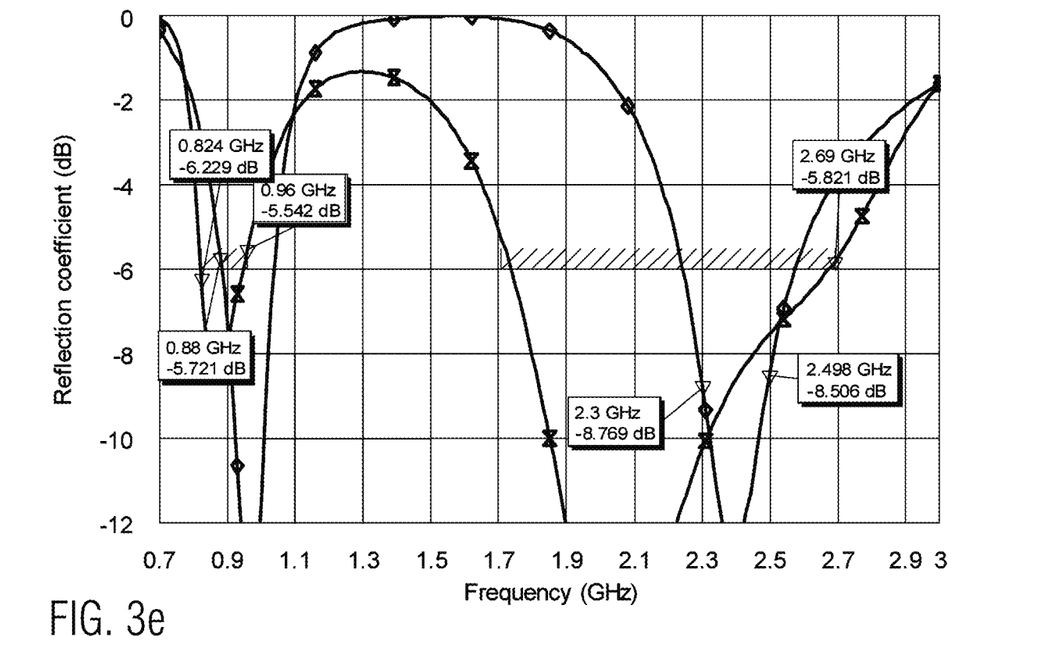
Figure 3F:
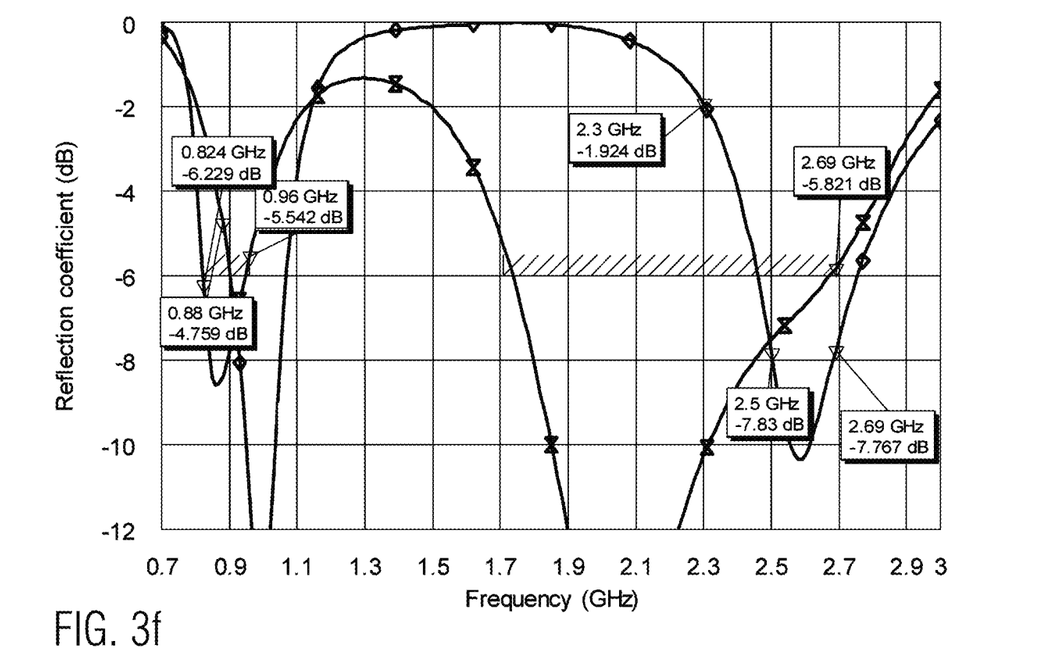

The capacitance of the corresponding tunable capacitor is 1.6 pF for FIG. 3a, 1.1 pF for FIG. 3b, 0.95 pF for FIG. 3c, 0.8 pF for FIG. 3d, 0.58 pF for FIG. 3e, and 0.45 pF for FIG. 3f. In FIG. 3a, the radiating system operates in the frequency region corresponding to the GSM1800 standard, in FIG. 3b, the radiating system operates in the frequency region corresponding to the GSM850 and GSM1900 standard, in FIG. 3c, the radiating system operates in the frequency region corresponding to UMTS, in FIG. 3d, the system operates in the frequency region corresponding to the GSM900 standard, and in FIG. 3e in the frequency region corresponding to the LTE2300 standard. In FIG. 3f, the system operates in the frequency region corresponding to the LTE2500 standard.

With three reactive components 1, 2, and 3, it is possible to match from 824-960 MB and from 1710-2690 MHz. In addition, for several frequency standards, for example GSM850, GSM900, and GSM1800 and LTE2500, the system comprising a tunable reactive element provides better matching than the solution using only passive components. Such a better matching may, in particular, result in better antenna efficiency. In addition, a radiofrequency system with a tunable reactive element may reduce the losses due to matching processes because a reduced number of components is used in comparison with the passive reactive elements solution.

In the system according to FIG. 2c, when considering the input impedance of the system with a single L series, capacitive impedance is present for low frequency regions, for example the frequency regions between 824-960 MHz. At the same time, there is an inductive impedance for high frequency regions, for example 1710-2690 MHz.

For low frequency regions, a single L series has to be used to bring the impedance into resonance, for the high frequency region, a capacitor has to be used. In examples of wireless multi-band devices, an LC-shunt is used in series with an inductor. For the low frequency region, the combination of LC is equal to C, for the high frequency region, it is equal to L. Since there is a tunable capacitor in this shunt, the radiofrequency systems has enough degrees of freedom to match both the low frequency region and the high frequency region.

FIG. 1c shows a ground plane layer and boosting element alternative to the one of FIG. 1b. In FIG. 1c, the ground plane layer 132 exemplarily has a size of 120 mm in one direction and of 60 mm in a direction perpendicular to it, is printed on a 1 mm high layer of FR4, a permittivity of 4.15 and tan δ=0.013, and the boosting element 131 has the form of a rectangular box with the length of 20 mm, a width of 3 mm, and a height of 1 mm. Other sizes for the ground plane layer and/or the boosting element and/or the ground plane layer being printed on a different material are also comprised by the invention.

FIG. 1c also shows an exemplary clearance area 133 around the boosting element 131 which extends along nearly the entire width of the ground plane layer 132 (with exception of a small strip 134). Such a small strip 134 may have in one direction (e.g., its width, measured in the same direction as the width of the ground plane layer) an extension of less than ¹⁄₁₀ of the width of the clearance area 133 (width again considered in the same direction as the width of the ground plane layer) and serves to connect boosting element 131 with the ground plane layer 132.

Figures 4A, 4C:
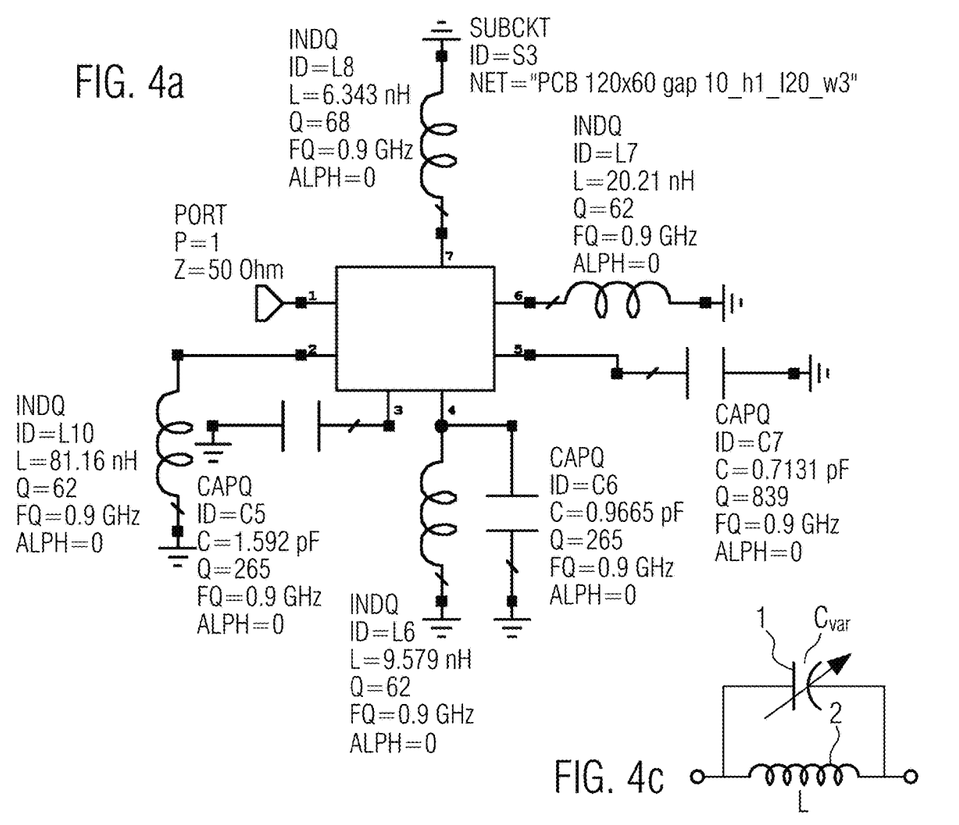
FIG. 4a shows a radiofrequency system according to the prior art.
FIGS. 4b and 4c show radiofrequency systems which may be used in a wireless device according to the present invention.

According to the prior art, for the matching such a radiating system, a radiofrequency system comprising at least six (lumped) components is required to match such a boosting element in several frequency regions in the areas 698-960 MHz and 1710-2690 MHz. FIG. 4a shows a prior art radiofrequency for matching such a system. Here, seven (lumped) components are shown. However, the inductive component LP=81 nH can be neglected, such that matching may also be achieved with six (lumped) components.

Figure 4B:
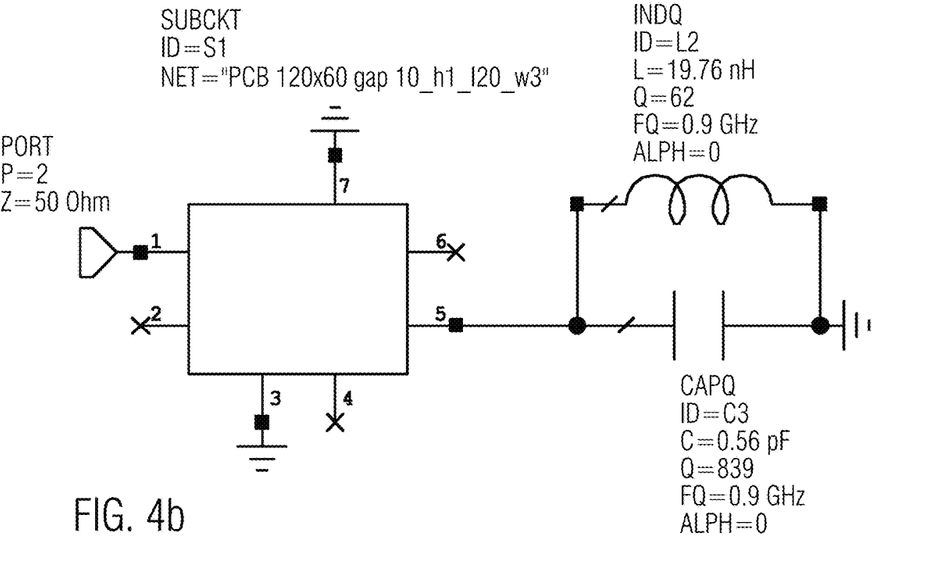

When using a tunable capacitor, matching in the areas between 698-960 MHz and 1710-2690 MHz can be achieved using one (passive) inductor 2 and one tunable capacitor 1, as shown for example in FIG. 4b and schematically in FIG. 4c. FIG. 4b shows a particular example of a radiofrequency system including examples for particular values that may be used. In the example of FIG. 4b, the capacitor is tunable. In other examples, one tunable inductor and one (passive) capacitor may be used (not shown).

Figure 5A:
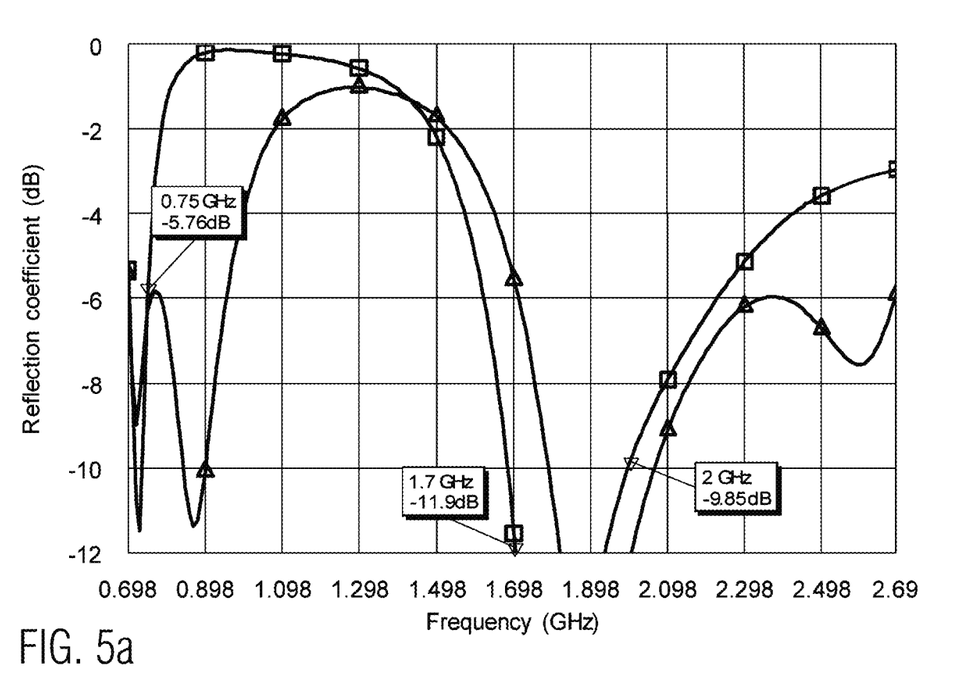
FIGS. 5a, 5b, 5c, 5d, and 5e show a comparison of a reflection coefficient of the prior art with an exemplary reflection coefficient of a radiofrequency system tuned to different values.
Figure 5B:
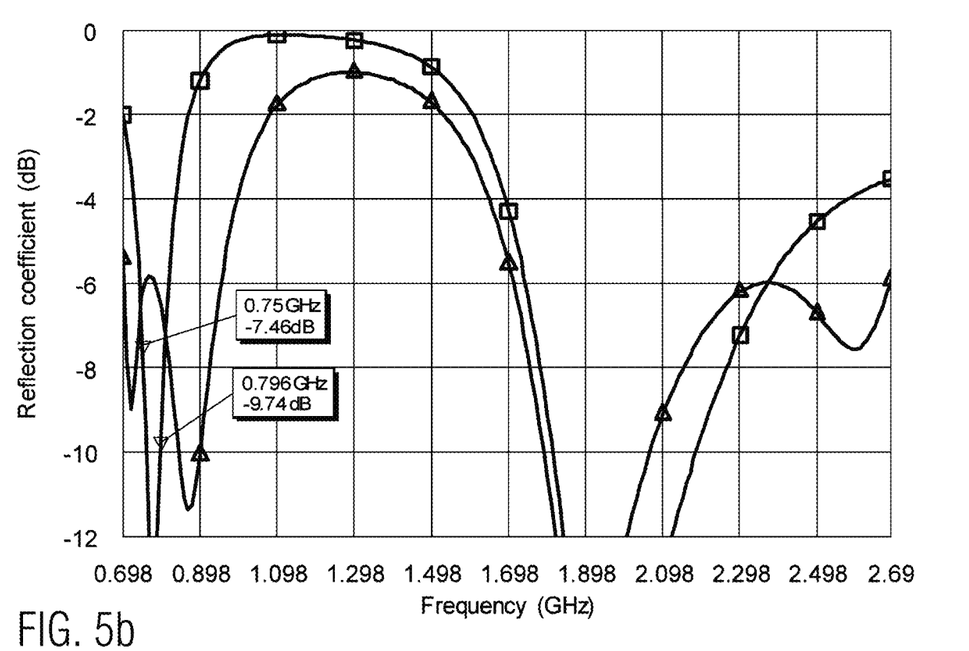
Figure 5C:
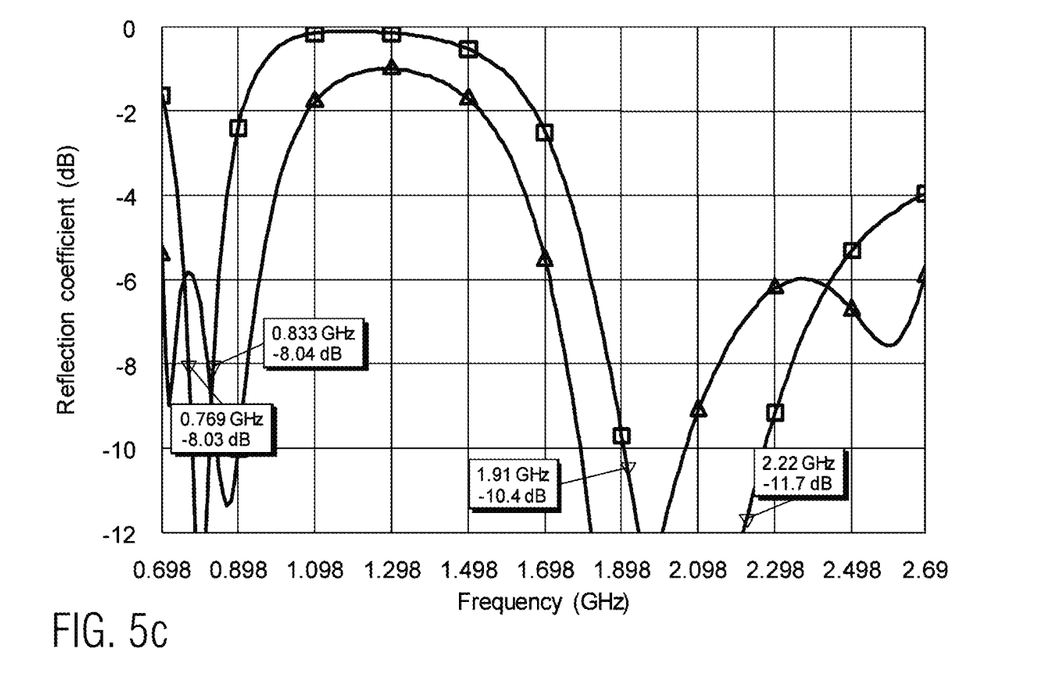

Corresponding reflection coefficients for such a system are shown in FIGS. 5a to 5c. Herein, the capacitance varies from 1.38 pF in FIG. 5a to 1 pF in FIG. 5b, 0.86 pF in FIG. 5c, 0.56 pF FIG. 5d, and 0.4 pF in FIG. 5c.

FIGS. 5a to 5e show how the reflection coefficient changes depending on the capacitance value of the tunable capacitor.

In particular, FIGS. 5a to 5d each show a comparison of a reflection coefficient for a radiofrequency system as of FIG. 4a (marked by triangles) with the reflection coefficient achieved with a matching system according to FIG. 4b (marked by rectangles) for a single value of capacitance of the tunable capacitor.

Figure 5D:
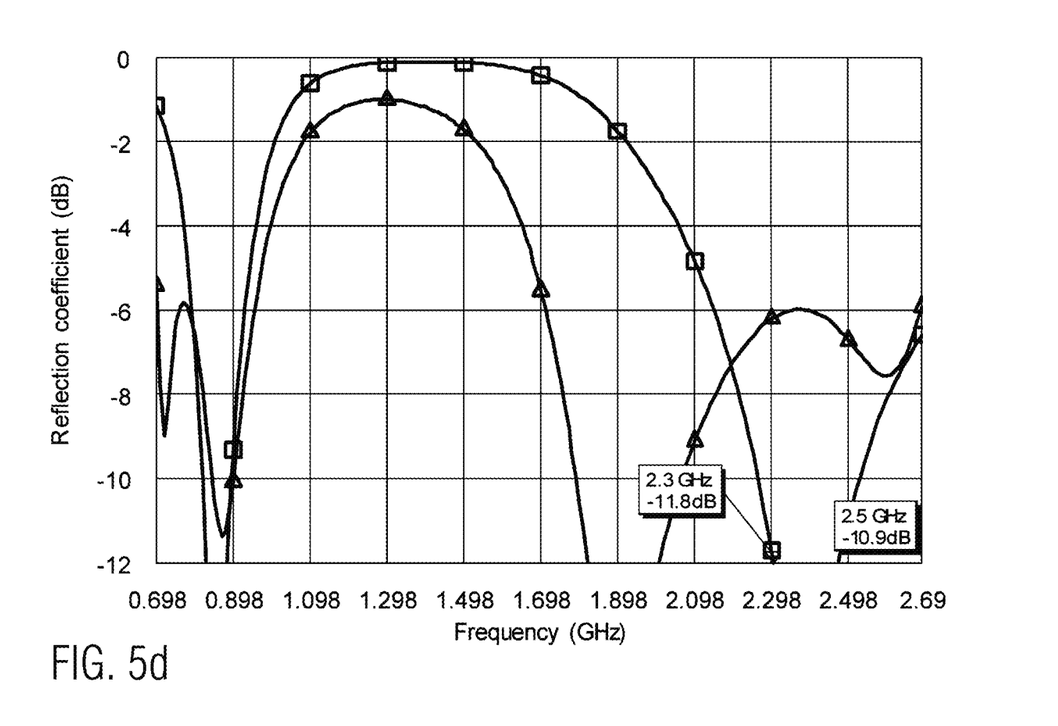
Figure 5E:
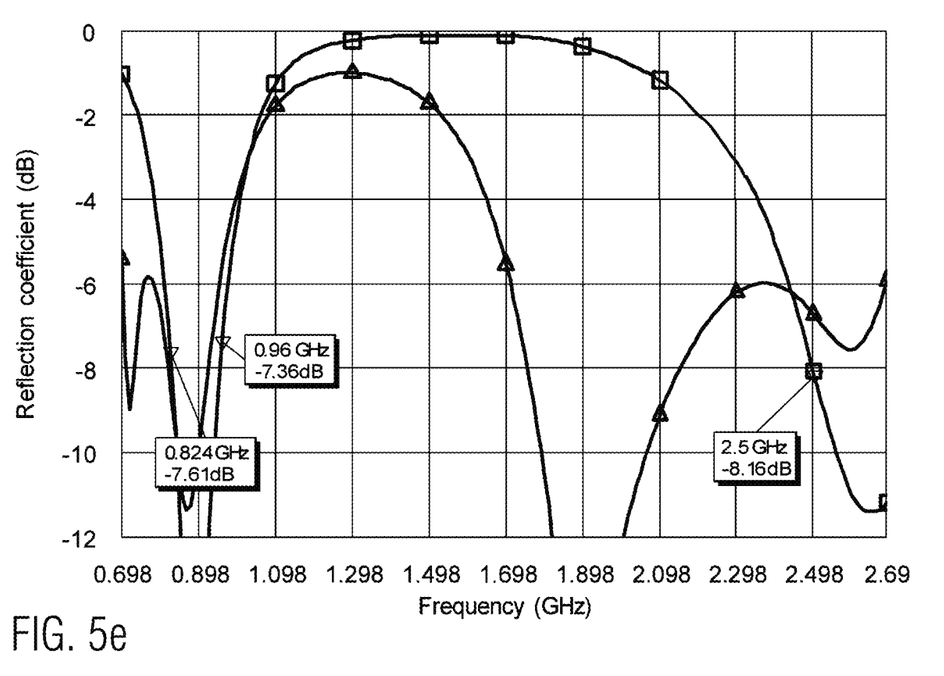

FIG. 5a shows matching in the areas of GSM1800 and GSM1900 and the frequency range between 698 MHz and 750 MHz, FIG. 5b shows a matching in the frequency region of 750 MHz to 798 MHz, FIG. 5c shows a matching to the frequency region used by the UMTS standard, FIG. 5d in the frequency region used for LTE2300, and FIG. 5e in the frequency region used for LTE2500.

Figure 1D:
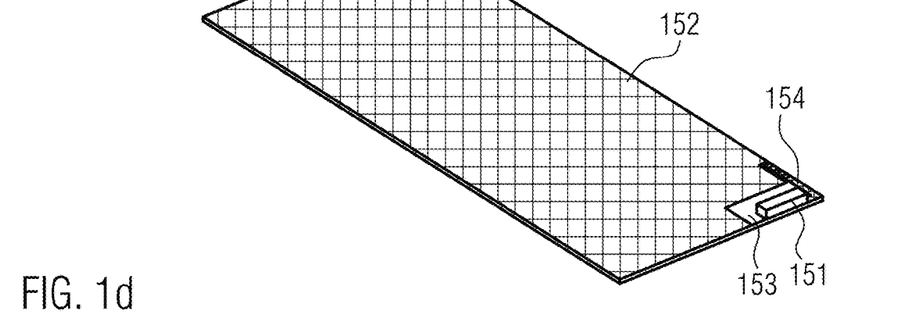

FIG. 1d shows another ground plane layer and boosting element alternative. In FIG. 1d, the ground plane layer 152 has a reduced clearance area 153 with regard to the one in FIGS. 1b and 1d extending over nearly the entire width of the ground plane layer. In FIG. 1d, also a remaining strip 154 of the ground plane layer connecting the ground plane layer and the booster.

Figure 1E:
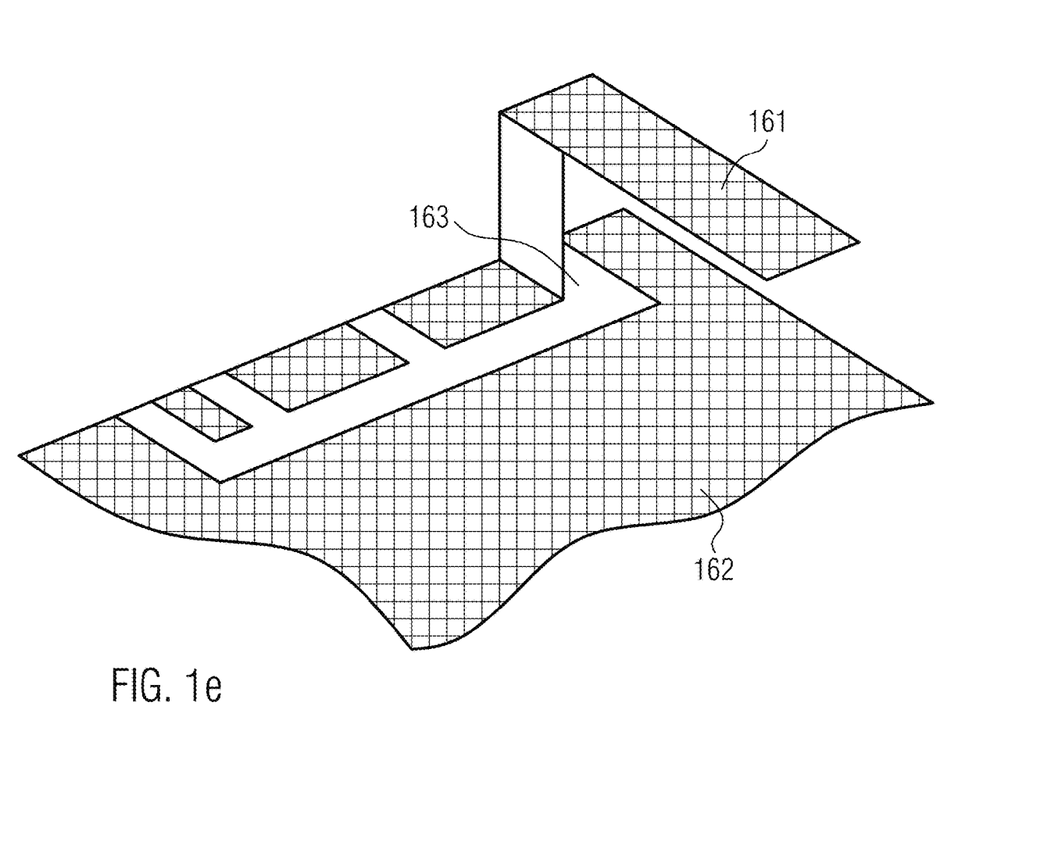
FIG. 1e shows an excerpt of an example for a ground plane layer that may be used in a wireless device according to the invention.

FIG. 1e shows another ground plane layer and boosting element alternative in which the boosting element is arranged overlapping onto the ground plane layer.

As can be seen, the use of a tunable reactive element in a radiofrequency system may improve the matching and/or reduce the number of boosting elements and/or reduce the number of components of the radiofrequency system.

What is claimed is:

1. A wireless device comprising:
   a ground plane layer having a maximum size smaller than half of a longest free-space operating wavelength of the wireless device;
   a boosting element having a largest dimension smaller than ⅙ times the longest free-space operating wavelength; and
   a radiofrequency system comprising a tunable reactive circuit including: a switch connected between the boosting element and a transceiver, and a bank of fixed matching networks,
   wherein at least a portion of an orthogonal projection of the boosting element onto a plane containing the ground plane layer overlaps the ground plane layer.

2. The wireless device of claim 1, wherein a matching within the bank of fixed matching networks comprises a series inductor.

3. The wireless device of claim 1, wherein a matching within the bank of fixed matching networks comprises a parallel LC circuit.

4. The wireless device of claim 1, wherein the boosting element has a largest dimension smaller than ¹⁄₁₀ times the longest free-space operating wavelength.

5. The wireless device of claim 1, wherein the boosting element has a largest dimension smaller than ¹⁄₂₀ times the longest free-space operating wavelength.

6. The wireless device of claim 1, wherein the boosting element has a largest dimension smaller than ¹⁄₃₀ times the longest free-space operating wavelength.

7. The wireless device of claim 1, wherein the ground plane layer has a maximum size smaller than $⅓^{rd}$ of the longest free-space operating wavelength.

8. The wireless device of claim 1, wherein the ground plane layer has a maximum size smaller than $1/4^{th}$ of the longest free-space operating wavelength.

9. The wireless device of claim 1, wherein the ground plane layer has a maximum size smaller than $1/5^{th}$ of the longest free-space operating wavelength.

10. The wireless device of claim 1, wherein the ground plane layer has a maximum size smaller than $1/10^{th}$ of the longest free-space operating wavelength.

11. The wireless device of claim 1, wherein the wireless device operates in two frequency regions.

12. The wireless device of claim 11, wherein the wireless device operates in a first frequency region from 698 MHz to 960 MHz and in a second frequency region from 1710 MHz to 2690 MHz.

13. A wireless device comprising:
- a ground plane layer having a maximum size smaller than half of a longest free-space operating wavelength of the wireless device;
- a boosting element having a largest dimension smaller than $1/6$ times the longest free-space operating wavelength; and
- a radiofrequency system comprising a matching network including a tunable reactive element,
- wherein at least a portion of an orthogonal projection of the boosting element onto a plane containing the ground plane layer overlaps the ground plane layer.

14. The wireless device of claim 13, wherein the matching network includes three reactive elements.

15. The wireless device of claim 14, wherein the matching network includes an inductor connected in series with a parallel arrangement of circuit elements including a tunable capacitor and an inductor.

16. The wireless device of claim 13, wherein the matching network includes a tunable capacitor.

17. The wireless device of claim 13, wherein the matching network includes a tunable capacitor arranged in parallel with an inductor.

18. The wireless device of claim 13, wherein the matching network includes a tunable inductor and a passive capacitor.

19. The wireless device of claim 18, wherein the tunable inductor comprises a switch and a bank of fixed inductors.

20. The wireless device of claim 13, wherein the matching network includes a tunable inductor and a tunable capacitor.

* * * * *